April 6, 1965

P. HOBGOOD ETAL 3,176,878

METERING AND PROPORTIONING APPARATUS FOR FLUENT SOLID MATERIALS

Filed Nov. 1, 1962

Price Hobgood
Walter Rosenberg
INVENTOR.

BY Eugene D Farley

Atty.

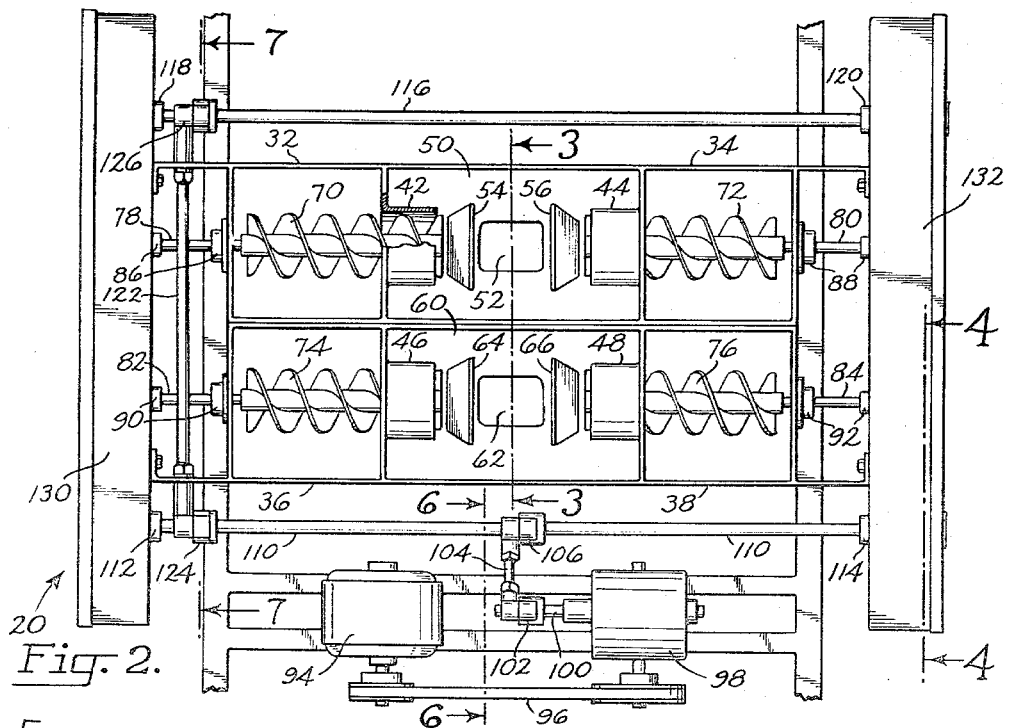

United States Patent Office 3,176,878
Patented Apr. 6, 1965

3,176,878
METERING AND PROPORTIONING APPARATUS FOR FLUENT SOLID MATERIALS
Price Hobgood, 509 Moran St., Bryan, Tex., and Walter Rosenberg, Cinebar, Wash.
Filed Nov. 1, 1962, Ser. No. 234,617
5 Claims. (Cl. 222—134)

This invention relates to apparatus for metering and proportioning fluent, solid materials.

The necessity frequently arises for forming a mixture of granular or other fluent solid materials in accordance with a predetermined formula. Thus in the raising of animals, it is necessary to provide feed mixtures containing various grains and other nutritional components. Also, in the chemical industry it frequently is necessary to mix various proportions of insecticides or other chemicals in powder or granular form in order to provide a finished commercial composition of desired properties.

It is the general object of this invention to provide apparatus which will proportion fluent solid materials and discharge them in measured flow to a common station where they may be mixed, blended, ground, packaged or otherwise processed as desired, the apparatus being characterized by the following features and advantages:

(1.) It is versatile in that it readily may be adapted to processing a variety of livestock feeds, dry chemical formulations and other solid mixtures.

(2.) It may be operated as a variable speed drive for a single discharge unit or with a single, constant speed drive for a plurality of discharging units in material-proportioning relation.

(3.) It blends the solid materials with a high degree of accuracy.

(4.) It is easily adjustable, as required to proportion materials into a selected one of a plurality of different formulations.

(5.) It is readily adapted to association with related processing apparatus such as mixers and grinders.

(6.) It is regulated easily as required to increase or reduce total mixing or blending capacity.

The apparatus having the foregoing advantages is described in the accompanying specification and illustrated in the drawings, wherein:

FIG. 2 is a plan view of the metering and proportioning unit incorporated in the mill of FIG. 1;

FIG. 4 is a transverse sectional view taken along line 4—4 of FIG. 2 and illustrating the proportioning means employed in the unit of that figure;

FIG. 5 is a sectional view taken along line 5—5 of FIG. 4;

FIG. 6 is a detail sectional view taken along line 6—6 of FIG. 2 and illustrating the drive means used in the apparatus of the invention;

FIG. 7 is a transverse sectional view taken along line 7—7 of FIG. 2 and further illustrating the drive means employed in the apparatus of the invention.

Figures 1, 3, 8, 9:
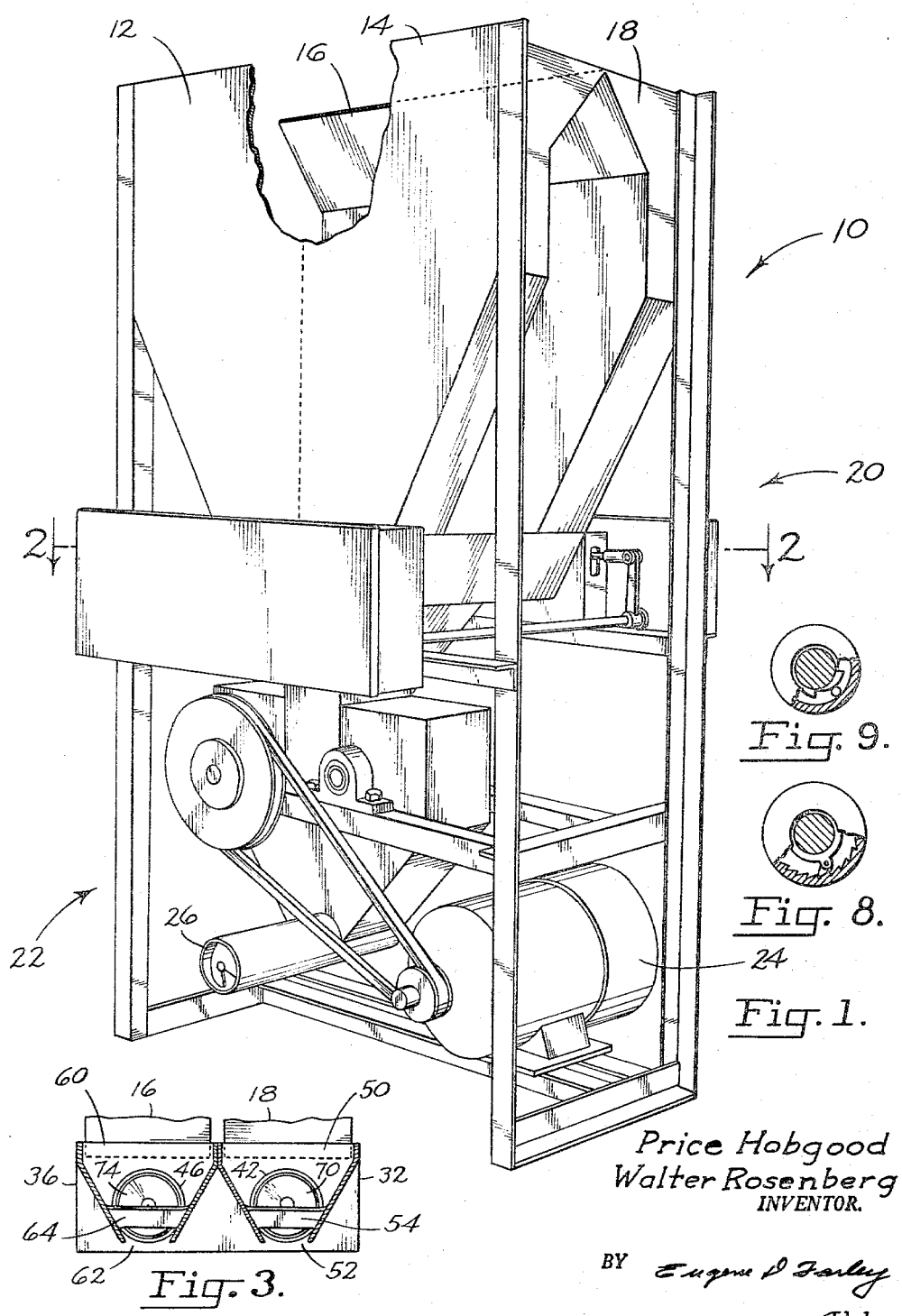
FIG. 1 is a view in perspective of a mill assembly incorporating the metering and proportioning unit of the present invention.
FIG. 3 is a detail sectional view taken along line 3—3 of FIG. 2.
FIGS. 8 and 9 are vertical elevations, partly sectioned, illustrating alternative types of actuating means for the feed screws.

As shown in FIG. 1, the presently described unit may be included in a grinding or roller mill assembly used by proportion agricultural feeds, to mix them, and to grind them, thus delivering from the mill a feed mixture composed of ingredients blended together in predetermined proportions.

In the illustrated embodiment of the invention the mill comprises a hopper 10, divided into four separate compartments 12, 14, 16, 18 each having sloping sides directing the fluent solid contents toward an opening in the bottom of the compartment.

These compartments feed into the proportioning unit of the assembly, indicated generally at 20 which, in turn, delivers the proportioned feed into a grinding unit, indicated generally at 22. The latter is driven by a motor 24 and discharges the proportioned and blended product through a discharge outlet 26.

The metering and proportioning unit is illustrated particularly in FIG. 2. It may include one or more compartments, there being four numbered 32, 34, 36 and 38 in the drawings. These register with and are fed by hoppers 12, 14, 16, 18 in the composite hopper assembly. The compartments are provided with inwardly directed discharge conduits 42, 44, 46, 48.

Conduits 42 and 44 discharge into a compartment 50 having sidewalls which slope downwardly into a discharge opening 52, leading to grinding unit 22. Baffles 54, 56 are mounted opposite the conduits, spanning the compartment, to prevent bleeding of the feed hopper contents downwardly through discharge opening 52 when the mill is idle.

Similarly, discharge conduits 46, 48 discharge into a compartment 60 which is formed with sloping sides converging downwardly into discharge opening 62. Like opening 52, the latter opening communicates with grinding unit 22. Also, there are provided in compartment 60, baffles 64, 66 which extend between the sidewalls of the compartment opposite the discharge openings to prevent inadvertent bleeding of the feed material through the discharge conduits when the mill is not in operation.

In each of compartments 32, 34, 36, 38 there is mounted rotary, material discharging means for discharging the contents of the chamber through its associated conduit. Such means comprises screws 70, 72, 74, 76 mounted on shafts 78, 80, 82, 84 which are journaled, respectively, in bearing pairs 86, 88, 90, 92. Thus mounted, the screws work in their respective compartments, conveying the solid contents thereof outwardly through the discharge conduits.

Screws 70, 72, 74, 76 are driven individually and adjustably by the drive illustrated in FIGS. 6 and 7.

A motor 94 and belt 96 drive a gear reducer 98. The shaft 100 of the reducer drives a crank 102 which is connected through link 104 with a second crank 106 fixed to rock shaft 110. The rock shaft is journaled in bearings 112, 114. It drives a synchronously running rock shaft 116 on the other side of the apparatus. The latter rock shaft is journaled in bearings 118, 120 and is coupled to its companion rock shaft 110 by means of connecting shaft 122 and cranks 124, 126.

The two rock shaft drives actuate the discharge screws 70, 72, 74, 76 in tandem arrangement, screws 70, 74 being driven through linkages contained in housing 130 and screws 72, 76 through linkages contained in housing 132. These linkages are substantially identical and are illustrated in FIGS. 4 and 5, with respect to the linkage driving screw 76.

Referring to these figures, it will be seen that rock shaft 110 mounts an adjustable throw crank arm 142 which is provided with a longitudinal guideway 144 having alongside an index scale 146.

A slide 148 works in guideway 144 and may be secured in any selected position relative to index scale 146 by means of screw 150.

Slide 148 mounts a laterally extending pivot pin 152 on which is journaled a bearing 154 connected to a bifurcated link assembly 156. This assembly includes a first link member 158, one end of which is fastened to bearing 154 and the other end of which is fastened to a bearing 160.

Extending outwardly from link member 158 is a pivot pin 162 journaled in a bearing 164. One end of a second and cooperating link member 166 is connected to this bearing, while the other end of the link member is connected to a second bearing 168.

Bearings 160, 168 are journaled, respectively, on pins 170, 172 mounted on the ends of lever arms 174, 176. The other ends of these lever arms are fixed to oppositely acting actuating means connected to the shaft 84 which drives screw 76.

The actuating means have for their function the conversion of the reciprocating motion of link members 158, 166 into a controlled rotary motion of screw 76. Accordingly they may comprise such mechanical units as oppositely acting ratchets, such as the type illustrated in FIG. 8, or, preferably, overrunning (indexing) clutches such as the type illustrated in FIG. 9 and indicated in FIG. 5 at 178, 180 respectively. These are operated by lever arms 174, 176 respectively and are arranged in such a manner that, as link members 158, 166 reciprocate in unison clutch 178 works on the advancing stroke and is idle on the retracting stroke, while the reverse is true of clutch 180.

Thus a substantially continuous rotary motion is imparted to shaft 84.

Operation

In its simplest form the present invention comprises but one of the multiple units illustrated in the drawings and including but a single screw such as screw 76 driven by a variable speed motor which either rocks or rotates shaft 110. This in turn reciprocates link members 158, 166 through the crank assembly including crank arm 142 and pin 152. As the link members reciprocate they work oppositely acting overrunning clutches 178, 180 in the manner described above, to rotate shaft 84 and hence screw 76 at a rate commensurate with the rotary speed of the motor.

The speed of screw 76 also may be adjusted, however, by adjusting the throw of the crank. This may be accomplished by adjusting the position of slide 148 in guideway 144, using screw 150 to secure and release the slide. As the throw of the crank is reduced, the speed of the screw is also reduced, and vice versa.

This factor may be utilized to great advantage in fabricating multiple assemblies such as are illustrated in the drawings and comprising a plurality of screws, each discharging from a separate compartment into a common unit, such as grinding unit 22. In this case, scales 116 may be calibrated and the crank throws of each unit adjusted to predetermined settings by adjustment of slides 148 in each unit. Each of the feed screws then will deliver to the grinding unit an amount of the hopper contents which corresponds to the setting of the slide. A very precise and easily effectuated metering and proportioning of the feed material thus is accomplished.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. Metering and proportioning apparatus for fluent solid material, said apparatus comprising:
   (a) a compartment adapted to hold the material,
   (b) rotary material-discharging means arranged for discharging the material from the compartment to a station outside the same,
   (c) actuating means for the rotary material discharging means comprising
       (1) a pair of drive coupling means secured to the rotary material-discharging means for rotation therewith, and
       (2) a pair of reciprocating drive lever means one releasably engaging each drive coupling means and projecting radially outward therefrom in opposite directions, one of the drive lever means being arranged in one direction of reciprocation to engage its associated coupling means and in the opposite direction of reciprocation to disengage from its associated coupling means, the other drive lever means being arranged in said one direction of reciprocation to disengage from its associated coupling means and in said opposite direction of reciprocation to engage its associated coupling means, whereby reciprocation of the pair of drive lever means effects rotation of the material-discharging means in one direction only,
   (d) a pair of link members connected at one end one to each of the lever means,
   (e) crank means,
   (f) connector means mounted on the crank means for adjustment along the length of the latter for adjusting the throw thereof, the connector means securing the pair of link members pivotally to the crank means at the ends of the link members opposite their connection to the drive lever means for reciprocating the link members in unison upon movement of the crank means, and
   (g) power driven shaft means supporting the crank means for movement therewith.

2. Metering and proportioning apparatus for fluent solid materials, said apparatus comprising:
   (a) a plurality of compartments arranged in tandem and each adapted to contain a preselected material,
   (b) in each compartment rotary material-discharging means arranged for discharging the material from the compartments to a common location outside the compartments,
   (c) actuating means for each rotary material-discharging means comprising
       (1) a pair of drive coupling means secured to the rotary material-discharging means for rotation therewith, and
       (2) a pair of reciprocating drive lever means one releasably engaging each drive coupling means and projecting radially outward therefrom in opposite directions, one of the drive lever means being arranged in one direction of reciprocation to engage its associated coupling means and in the opposite direction of reciprocation to disengage from its associated coupling means, the other drive lever means being arranged in said one direction of reciprocation to disengage from its associated coupling means and in said opposite direction of reciprocation to engage its associated coupling means, whereby reciprocation of the pair of drive lever means effects rotation of the material-discharging means in one direction only,
   (d) a pair of link members associated with each actuating means and connected at one end one to each of the lever means,
   (e) crank means associated with each actuating means,
   (f) connector means mounted on each crank means for adjustment along the length of the latter for adjusting the throw thereof, the connector means securing the associated pair of link members pivotally to the crank means at the ends of the link members opposite their connection to the associated drive lever means,
   (g) a plurality of driven shaft means one supporting each crank means for movement therewith, (h) coupling means interconnecting the plurality of driven shaft means for moving the latter simultaneously, and (i) drive means operatively connected to one of the driven shaft means for moving the plurality of driven shaft means.

3. The apparatus of claim 2 wherein the drive means is connected to the shaft for oscillating the latter, and the coupling means comprises link means pivotally interconnecting lever arms projecting from the plurality of shaft means.

4. The apparatus of claim 2 wherein each actuating means comprises a lever-operated ratchet.

5. The apparatus of claim 2 wherein each actuating means comprises a lever-operated indexing clutch.

References Cited by the Examiner
UNITED STATES PATENTS

| | | | |
|---|---|---|---|
| 275,144 | 4/83 | Chapman | 74—156 |
| 289,216 | 11/83 | Bush | 74—142 |
| 641,313 | 1/00 | Martin | 74—142 X |
| 827,664 | 7/06 | Pumphrey | 222—134 |
| 1,032,455 | 7/12 | Waskom | 74—142 X |
| 2,687,244 | 8/54 | Peterson | 222—272 X |
| 3,037,671 | 6/62 | Cochran | 222—142 |

LOUIS J. DEMBO, *Primary Examiner.*